(12) United States Patent
Kang

(10) Patent No.: US 11,646,908 B2
(45) Date of Patent: May 9, 2023

(54) DEVICE FOR PROVIDING ENHANCED SPEED FOR CONNECTED NODES ON A BUS

(71) Applicant: VELONECT INC., San Jose, CA (US)

(72) Inventor: Suwon Kang, Guri-Si (KR)

(73) Assignee: VELONECT INC., San Jose, CA (US)

( * ) Notice: Subject to any disclaimer, the term of this patent is extended or adjusted under 35 U.S.C. 154(b) by 0 days.

(21) Appl. No.: 17/050,958

(22) PCT Filed: Apr. 23, 2019

(86) PCT No.: PCT/KR2019/004889
§ 371 (c)(1),
(2) Date: Oct. 27, 2020

(87) PCT Pub. No.: WO2019/209004
PCT Pub. Date: Oct. 31, 2019

(65) Prior Publication Data
US 2021/0234725 A1    Jul. 29, 2021

(30) Foreign Application Priority Data
Apr. 27, 2018 (KR) .......................... 10-2018-0049367

(51) Int. Cl.
*H04L 12/40* (2006.01)
(52) U.S. Cl.
CPC .................. *H04L 12/40169* (2013.01); *H04L 2012/40215* (2013.01); *H04L 2012/40273* (2013.01)
(58) Field of Classification Search
CPC . H04L 2012/40215; H04L 2012/40273; H04L 12/40169; H04L 12/40013;
(Continued)

(56) References Cited

U.S. PATENT DOCUMENTS

| 6,839,347 B1 * | 1/2005 | Ishida | ..................... H04L 47/62 370/389 |
| 2002/0054647 A1 * | 5/2002 | Heuts | .................... H04L 25/063 375/257 |

(Continued)

FOREIGN PATENT DOCUMENTS

JP          5057304 B2    10/2012
KR   10-2010-0027794 A    3/2010
(Continued)

OTHER PUBLICATIONS

International Search Report dated Aug. 2, 2019, corresponding to International Application No. PCT/KR2019/004889.

(Continued)

*Primary Examiner* — Stephen J Clawson
(74) *Attorney, Agent, or Firm* — Hauptman Ham, LLP

(57) ABSTRACT

A bus adapter comprises: an interface unit configured to be connected to a Communication Module (CM), which is intended to communicated based on a first Communication Protocol (CP) such as CAN, via a first and a second signal lines, and to transceive bit signals through the first and the second signal lines; and a link control unit, connected to a data bus of a second CP, configured to transmit data stored in an outward buffer through the data bus, and to detect data from signals being carried on the data bus. The interface unit transmits data stored in an inward buffer to the CM via the second signal line in form of a format defined by the first CP and it drives the second signal line so that a bit string appears on the second signal line when the bit string is received through the first signal line.

13 Claims, 5 Drawing Sheets

(58) Field of Classification Search
CPC ......... H04L 12/40032; H04L 12/40071; H04L 12/40182
See application file for complete search history.

(56) References Cited

U.S. PATENT DOCUMENTS

| | | | | |
|---|---|---|---|---|
| 2003/0067877 | A1* | 4/2003 | Sivakumar | H04L 47/32 370/235 |
| 2004/0186690 | A1* | 9/2004 | Swanson | H05K 1/0266 702/187 |
| 2005/0254518 | A1* | 11/2005 | Fujimori | H04L 69/08 370/466 |
| 2006/0245543 | A1* | 11/2006 | Earnst | A61N 5/1049 378/65 |
| 2007/0140294 | A1* | 6/2007 | Takatori | H04L 12/40032 370/466 |
| 2007/0198900 | A1* | 8/2007 | Ryu | H04L 45/40 714/776 |
| 2008/0246626 | A1* | 10/2008 | Sheafor | G09G 5/008 340/4.2 |
| 2013/0139018 | A1* | 5/2013 | Takada | H04L 12/417 714/748 |

FOREIGN PATENT DOCUMENTS

| | | |
|---|---|---|
| KR | 10-2015-0050960 A | 5/2015 |
| KR | 10-1573637 B1 | 12/2015 |
| KR | 10-1586601 B1 | 2/2016 |

OTHER PUBLICATIONS

Korean Office Action dated Apr. 1, 2019, in connection with the corresponding Korean Patent Application No. 10-2018-0049367 with machine translation.

* cited by examiner

DEVICE FOR PROVIDING ENHANCED SPEED FOR CONNECTED NODES ON A BUS

CROSS-REFERENCE TO RELATED APPLICATION

This present application is a national stage filing under 35 U.S.C § 371 of PCT application number PCT/KR2019/004889 filed on Apr. 23, 2019 which is based upon and claims the benefit of priority to Korean Patent Application No. 10-2018-0049367 filed Apr. 27, 2018 in the Korean Intellectual Property Office. The disclosures of the above-listed applications are hereby incorporated by reference herein in their entireties.

TECHNICAL FIELD

The present invention relates to a device for providing a data bus to which a plurality of nodes are connected for communication with each other, and more particularly to a device for providing a new data bus by replacing a physical bus and a transceiving interface directly connected thereto.

DESCRIPTION OF THE RELATED ART

Many kinds of apparatuses that make life easier for persons have a wide variety of functions, and in case of a complex apparatus among them, especially a vehicle, a lot of information is transceived in real time between various electronic control units (ECUs). Such information exchange within a vehicle, etc. is mainly performed through a specific type of communication network, for example, CAN (Controller Area Network).

The special type of communication network, such as a CAN adopted for a vehicle and the like, is used for communication of control signals for an engine and a gearbox etc. for driving control, the driving status and diagnosis of a vehicle, and the status of safety and comfort equipment.

As illustrated in FIG. 1, an ECU supporting the CAN comprises, for communication based on the CAN standard, a CAN controller 10, which is a communication module for transceiving data in compliance with the CAN protocol, and a transceiver 11 for transceiving signals through a CAN bus line that provides a bit rate of up to 1 Mbps for data transmission among connected nodes. Therefore, if the CAN bus is configured at a speed of 1 Mbps, data bits are also carried on the basis of a clock of 1 Mbps on a transmission line C_Tx and a receiving line C_Rx for signal transmission/reception between the CAN controller 10 and the transceiver 11.

Nowadays, in addition to the data relating to the above-mentioned status and operation, etc. of a vehicle, various types of data are generated within a vehicle. For example, an AV device equipped in a vehicle may play multimedia contents stored in a storage device, a navigation device may receive TPEG data and display it on a screen. Furthermore, data resulting from continuously photographing a road ahead of the vehicle or lanes of a road on which the vehicle is traveling are generated by an improved driving convenience function of the vehicle, e.g., an auto cruise function or the like.

As such, a significantly greater amount of data is generated in a vehicle than before, and these new types of data need to be also shared among the ECUs by communication or transmitted over a communication network to a terminal that processes the data. However, the interface for the CAN communication illustrated in FIG. 1, which is universally applied to vehicles at present, is not fast enough to accommodate these new types of data.

According to the communication protocol defined in the CAN, the CAN controller 10 cannot transmit data bits through the transmission line C_Tx when receiving data bits from the transceiver 11, and every signal carried on the CAN bus is detected by the transceiver 11 and is to be transmitted as data bits to the CAN controller 10 via the receiving line C_Rx.

Therefore, in a bus arbitration based on a unique identifier (ID), a CAN controller of a node having a low priority inevitably has reduced chances to transmit data of 1 Mbps through a transmission line because the transmission chances are in inverse proportion to the degree of occupancy of the receiving line C_Rx. This situation stands out more as the number of nodes connecting in common to a single CAN bus increases.

This situation can be solved by constructing a separate CAN bus and distributing the nodes to different CAN buses. However, this solution increases the number of components required for vehicle manufacturing, which will cause a vehicle manufacturer to bear additional burdens (such as parts management and increase of assembly processes, etc.).

For the reasons described above, manufacturers of vehicles, etc. want to install a communication network of a higher speed in a vehicle or the like. In order to apply a bus of a new communication system serving a higher speed, all of the CAN controller chips of the ECUs must be replaced with new communication chips complying with the new system. However, developing or adopting a new component being capable of transmitting and receiving data based on higher speed clock, to replace a component such as a CAN controller that is already stable and reliable in performance, may be reluctant from the point of view of a manufacturer that must consider the time, cost, and unpredictable quality of transmission signals and the like.

SUMMARY OF THE INVENTION

It is an object of the present invention to provide a device for serving nodes with a speed-enhanced bus without changing the conventional bus control scheme.

It is another object of the present invention to provide a device for serving a speed-enhanced bus to its node by minimally replacing the conventional bus interface of the node.

The scope of the present invention is not necessarily limited to the above explicit statements. Rather, the scope of the present invention covers anything to accomplish effects that could be derived from the specific and illustrative explanations of the present invention below.

A device for providing a bus that allows nodes to communicate with each other in accordance with one aspect of the present invention, comprises: an interface unit configured to be connected to a Communication Module (CM) via a first signal line and a second signal line, and to transceive bit signals through the first signal line and the second signal line; a first buffer configured to store data of an arbitrary format constituted from a bit string received by the interface unit from the CM via the first signal line; a link control unit configured to be connected to a data bus of a second CP whose transmission speed is higher than that of the first CP, to transmit data stored in the first buffer through the data bus, and to detect data from signals being carried on the data bus; and a second buffer configured to store data, detected by the link control unit, in an arbitrary format. The interface unit transmits data stored in the second buffer to the CM via the second signal line in form of a specific format defined by the first CP. Further, when an arbitrary bit string is received through the first signal line, the interface unit drives the second signal line so that the arbitrary bit string appears on the second signal line.

In one embodiment according to the present invention, the interface unit drives the second signal line so that an acknowledgment (ACK) signal appears on the second signal line for a duration corresponding to an ACK slot of the specific format which a bit string received through the first signal line is formed in. In the present embodiment, if a bit string is received through the first signal line in a state where data transmission through the data bus of the second CP cannot be completed the interface unit may drive the second signal line so that a negative acknowledgment signal appears on the second signal line for a duration corresponding to the ACK slot. The acknowledge signal or the negative acknowledge signal is a signal appearing on the second signal line by driving the second signal line with a result of a logical computation of a logic value on the first signal line and a logic value indicating an acknowledgment or negative acknowledgment response at a time corresponding to the ACK slot.

In another embodiment according to the present invention, if there is no space to store in the first buffer when a certain bit string is received through the first signal line, the interface unit drives the second signal line so that signals of a data frame of the specific format appear on the second signal line instead of the certain bit string wherein the data frame has an identifier with the highest priority in bus arbitration applied to the first CP. In the present embodiment, the interface unit creates the data frame in such a manner that information contained in the data frame can be ignored by the CM.

In one embodiment according to the present invention, when start of receiving a first bit string through the first signal line and start of transmitting a second bit string of data stored in the second buffer through the second signal line collide with each other, the interface unit drives the second signal line so that signals resulting from contention between the first bit string and the second bit string based on the first CP appear on the second signal line, or so that signals of the first bit string appear on the second signal line without contention between the first bit string and the second bit string based on the first CP if remaining space of the second buffer is larger than a predetermined threshold.

In one embodiment according to the present invention, filtering information to be set in the link control unit or the interface unit is used in such a manner that only data of an arbitrary format, among data of the arbitrary format made by the link control unit from detected signals being carried on the data bus, containing an identifier matching the filtering information is transmitted to the CM through the second signal line. Further, the filtering information is received by the interface unit through the first signal line as data of a format defined by the first CP.

In one embodiment according to the present invention, the link control unit constructs data to be transmitted through the data bus into a frame with a header including a specific number assigned as a link identifier; transmits the constructed frame through the data bus; and does not store data carried in another frame in the second buffer if a header of the another frame contains a number, as the link identifier, that does not match at least one assigned number including the specific number, wherein the another frame is constructed from detected signals on the data bus. In this embodiment, at least two different numbers corresponding to the link identifier are assigned to a plurality of link control units connected to the data bus of the second CP, and each of the at least two numbers is assigned to a plurality of link control units.

In the variety of embodiments with respect to the above-described device, the first CP may be a CP defined by CAN (Controller Area Network) or CAN-FD (CAN with Flexible Data).

In accordance with the present invention described above or at least one embodiment of the present invention described in detail below with reference to appended drawings, a device for providing a speed-enhanced bus to a connected node enables an ECU to use a much faster bus than conventional CAN or CAN-Flexible Data (CAN-FD) bus by replacing only a transceiver pertaining to the ECU mounted on a vehicle or the like.

Therefore, a manufacturer of vehicle etc. can install a high-speed bus, easily and with a reduced burden, in a product such as vehicle requiring exchange of information between components, thereby achieving the improved usability or embodying the advanced performance or function of equipment, which requires a high-speed bus, for the product.

In addition, it is possible to integrate the existing ECUs, which are distributed and connected to a plurality of buses until now, onto a single high-speed bus, and as a result, the number of components or parts of the product is reduced and the works such as management and assembling process are simplified.

DETAILED DESCRIPTION

Figure 1:
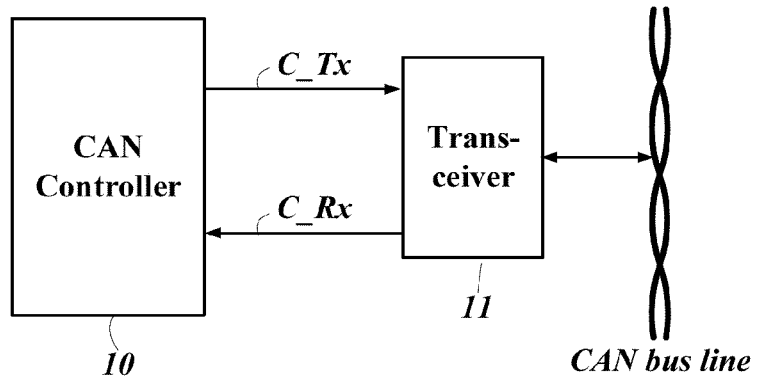
FIG. 1 shows only configuration of part, in an existing ECU, which is connected to the CAN bus.

In what follows, embodiments of the present invention will be described in detail with reference to appended drawings.

In the following description of the embodiments of the present invention and the accompanying drawings, the same reference numerals or symbols designate the same elements unless otherwise specified. Of course, for convenience of explanation and for the sake of understanding, the same components may be indicated by different reference numbers or symbols if necessary.

Figure 2:
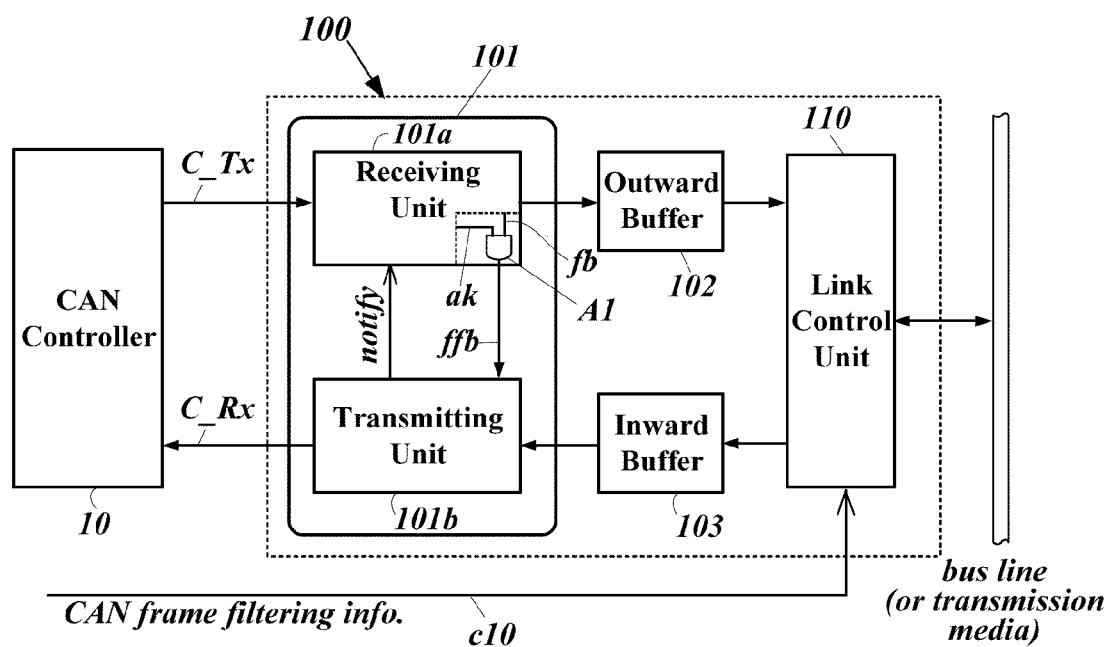
FIG. 2 illustrates configuration of a device for providing a bus of an enhanced bit rate for a connected node, together with its peripheral configuration, according to an embodiment of the present invention.

FIG. 2 illustrates configuration of a device for providing a bus of an enhanced bit rate for a connected node, together with its peripheral configuration, according to an embodiment of the present invention.

A device 100 illustrated in FIG. 2 configured according to the present invention allows a CAN controller, which is intended to communicate in compliance with the CAN protocol, to be capable of communicating via a high-speed data bus replacing a conventional CAN bus while conforming to the existing communication protocol. In this specification, the device 100 is referred to as a "bus adapter".

The bus adapter 100 comprises: a CAN interface 101 for transmitting and receiving bit signals to and from a CAN controller 10, which is a conventional communication module, through a transmission line C_Tx and a receiving line C_Rx that are separated from each other; an outward buffer 102 in which bit streams received by the CAN interface 101 are stored in units of CAN frames; an inward buffer 103 in which data received from other nodes are stored in units of CAN frames; and a link controller 110, connected physical to a high-speed (for example, 100 Mbps or more) bus that is faster than the existing CAN bus, for transmitting CAN frames stored in the outward buffer 102 in compliance with the communication protocol of the high-speed bus, and detecting data on the high-speed bus to store the detected data in the inward buffer 103 in the units of CAN frames.

The CAN interface 101 includes a receiving unit 101a for receiving the bit signals transmitted by the external CAN controller 10 through the transmission line C_Tx, and a transmitting unit 101b for transmitting the CAN frames stored in the inward buffer 103 to the CAN controller 10 through the receiving line C_Rx.

Although the bus adapter 100 is eventually used for data communication between the nodes at a higher speed bus of a communication protocol different from that of the conventional CAN bus, it conducts operations to make the high-speed bus appear to the external CAN controller 10 as a CAN bus.

As a high-speed bus to which the bus adapter 100 is physically connected, any bus, for example, the higher-speed Ethernet or other type of higher-speed bus known or to be developed sooner or later, that has or will be proven to be stable and reliable with a higher transfer rate than the CAN or CAN-FD bus is applicable to embodying the present invention. In this case, the link controller 110 transmits/receives signals in accordance with the communication protocol of the adopted bus when communicating over a physically connected bus.

The operations of the bus adapter 100, which adapts the communication of the CAN controller operating in basis of the CAN protocol to the high-speed bus, will be described in detail below. However, the following description can be applied not only to the CAN protocol but also to other communication protocol (which may be different in physical layer from CAN) such as CAN-FD etc. that uses the same manner in bus arbitration, message response and the like as the CAN protocol. Accordingly, the scope of the present invention should not be construed as limited to the CAN protocol unless the claims claiming the right of the present invention expressly limits the scope thereof.

The conventional CAN controller 10 connected to the bus adapter 100 transmits a frame start bit SOF and a unique ID (this is a bit string corresponding to an arbitration field for bus occupation) sequentially to the transmission line C_Tx at a predetermined timing when there is data to be transmitted to other nodes. Here, the predetermined timing is to select an arbitrary time after the time point when the bit pattern of consecutive 7 bits of logical 1, which is defined as the "frame end" for the CAN frame, is detected on the receiving line C_Rx.

In order to satisfy such timing requirement for transmission of the CAN controller 10, when there is no CAN-frame to be transmitted to the CAN controller 10 in the inward buffer 103, the transmitting unit 101b of the CAN interface 101 keeps the receiving line C_Rx in the state of a recessive level.

The recessive level is defined for a level appearing on a bus where transmission and reception of signals are simultaneously used via a single line (here, a single line refers to a related signal line under the condition that one line used as a reference of a signal is excluded from the physical signal lines constituting the bus), as in the CAN (or CAN-FD) communication system. The recessive level refers to a level opposite to a dominant level. When both levels are simultaneously asserted on a single signal line, a dominant level appears on the signal line. In the CAN (or CAN-FD) communication system, because the recessive level is a level that appears on the signal line when there is no electrical drive (such bus signal line asserting according to the logic value is performed by a conventional CAN transceiver 11), the dominant level naturally appears on the signal line, i.e., the bus when the signal line is driven with a logic value corresponding to the dominant level. Normally, the dominant level corresponds to the value of logic 0, and the recessive level corresponds to the value of logic 1, and therefore, the description in this specification is based on the assumption of such a relationship between level and logical value.

However, unlike the conventional case where the CAN controller is connected to the bus via a conventional CAN transceiver, in the case that the CAN controller is connected indirectly to the bus via the bus adapter 100 intervening therebetween as in the present invention, the CAN interface 101, which is connected to the CAN controller 20 that drives the transmission line C_Tx with respect to the logic 1 and 0, also drives the receiving line C_Rx for the logic 1 and 0 respectively to transmit digital signals to the counterpart. Previously, the state of logic 1, which is made on a single line when it is not driven by electrical signal to allow the collision of logic 1 and 0, was called a recessive level. However, in this specification, in order to apply the same terminology to the signal states defined by CAN or CAN-FD for the frame bits transmitted between the CAN controller 20 and the bus adapter 100, the state of logic 1 is also called as a recessive level although the signal lines C_Tx and C_Rx are electrically driven even in case of logic 1.

Figure 3:
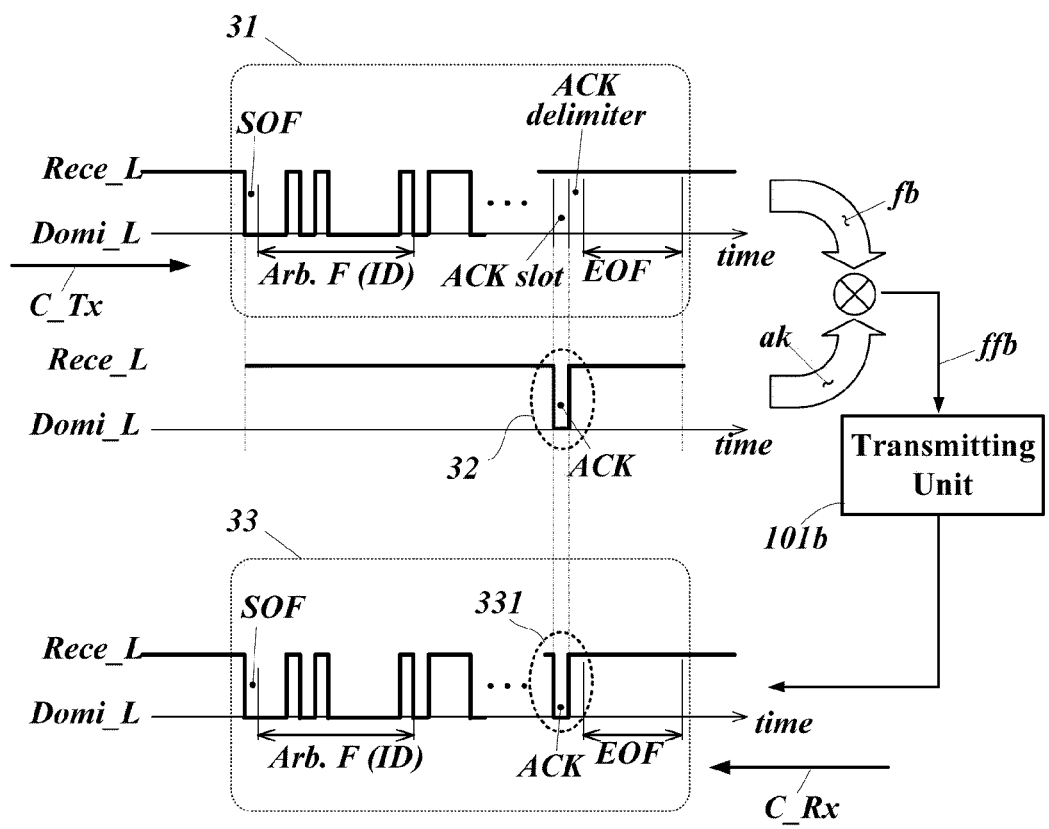
FIG. 3 is a diagram illustrating a process in which the bus adapter of FIG. 2 inserts an ACK signal while applying signals being received from the CAN controller to the CAN controller as they are, in accordance with an embodiment of the present invention.

As illustrated in FIG. 3, while receiving the frame start bit of logic 0 and the bits 31 of logic 1 or 0 sequentially from the transmission line C_Tx, the receiving unit 101a of the CAN interface 101 temporarily stores the bits being received and feeds them back (fb) to the transmitting unit 101b. This bit stream being fed back (fb) is logically ANDed with an acknowledgment signal (ak), which is generated to notify the success or failure of reception, in an AND gate A1, and is finally applied to the transmitting unit 101b.

Since the reception acknowledgment signal (ak) is a signal that is output as a logic 0 by the receiving unit 101a, when it is confirmed that the frame is successfully received, and is always held at a value of a logic 1 except for such confirmation, digital signals of 0 and 1 fed back (fb) is finally applied to the transmitting unit 101b (ffb) except for the case where the receiving unit 101a inserts an ACK (acknowledgment) signal (32) indicating a 'successful reception', that is, a logic 0, into the ACK slot allocated in the frame of the bits.

The transmitting unit 101b drives the receiving line C_Rx in accordance with a series of bits 33 being fed back from the receiving unit 101a to copy the bit string 33 received currently through the transmission line C_Tx onto the receiving line C_Rx.

While the CAN controller 10 transmits the bits constituting a frame through the transmission line C_Tx, the bit pattern corresponding to the unique ID transmitted by the CAN controller 10 is applied to the CAN controller 10 as it is due to the copy onto the receiving line C_Rx. Accordingly, the CAN controller 10 continues to transmit data bits corresponding to the CAN frame following the unique ID after acknowledging that the bits on the receiving line C_Rx corresponding to the arbitration field (which is assigned for unique ID) are all identical to the bits transmitted by itself. Afterwards, by the operation of the receiving unit 101a described above, the CAN controller 10 confirms that the value of the ACK slot indicates 'successful reception' (331) with respect to the frame transmitted by the CAN controller 10. As a result, the transmission of the CAN frame is completed. That is, after the ACK slot, the transmission line C_Tx is driven to the recessive level by a predetermined number of bits (ACK delimiter, frame end pattern (EOF), etc.).

In the meantime, during the transmission of the CAN controller 10, the receiving unit 101a receives all the bits corresponding to the CAN frame. When the bits being temporarily stored during the reception constitute one CAN frame, the CAN frame is stored in the outward buffer 102. Preferably, the CAN frame except the frame start bit, the bits of the ACK field (ACK slot and delimiter) and the frame end bits may be stored in the outward buffer 102.

On the other hand, if at least one CAN frame is stored in the inward buffer 103, the transmitting unit 101b reads data of the corresponding frame in the order in which the frames are stored, and transmits the read data through the receiving line C_Rx. Of course, if the stored CAN frame does not include the frame start bit and the frame end pattern etc., bits corresponding to them are added before and after the frame to be transmitted prior to transmitting the frame.

Figure 4:
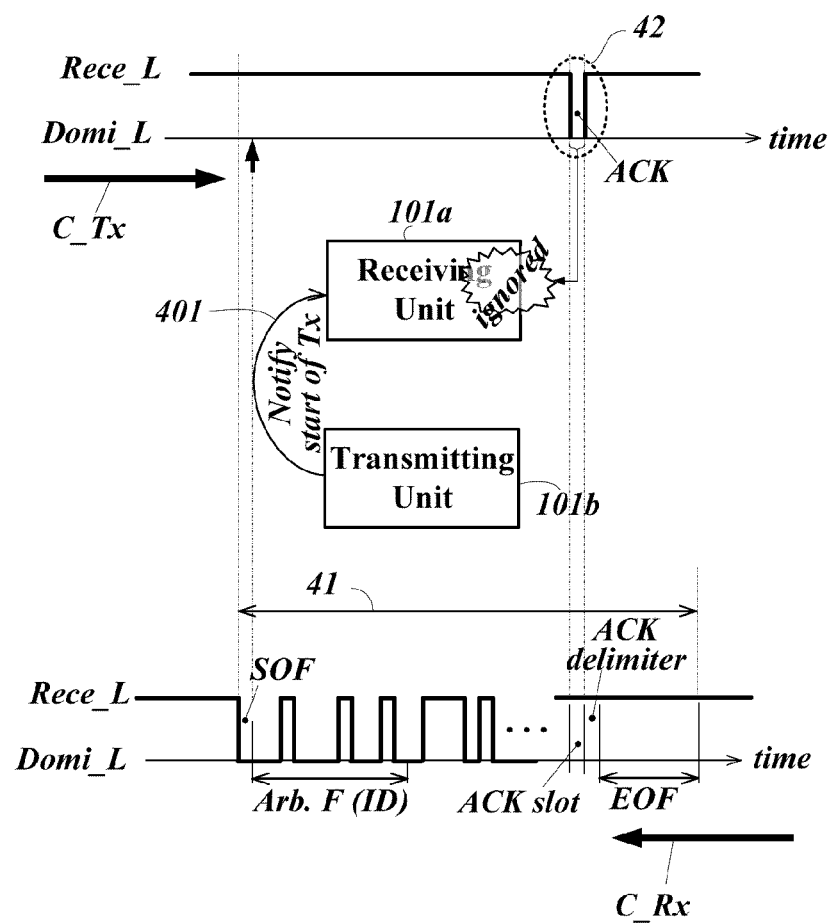
FIG. 4 illustrates a process of transferring data of a frame, which is received from a high-speed bus to which the bus adapter of FIG. 2 is connected, to a CAN controller according to an embodiment of the present invention.

Then, as illustrated in FIG. 4, when the transmission of the bits over the receiving line C_RX is started, the transmitting unit 101b notifies the fact of transmission to the receiving unit 101a immediately (401). This notification causes the receiving unit 101a to ignore the dominant level 42 of the ACK slot generated on the transmission line C_Tx in response to the reception of the frame 41 by the CAN controller 10, so that it is not recognized as the start of frame transmission.

Figure 5:
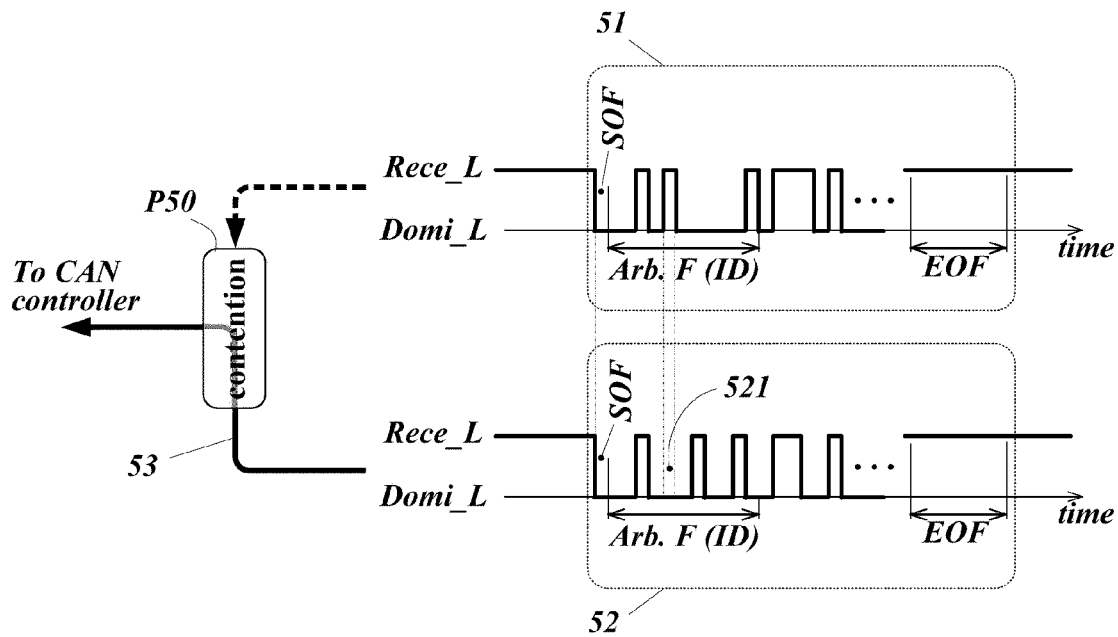
FIGS. 5 and 6 respectively illustrate processing methods when the start of transmission of a frame received from a high-speed bus to the CAN controller and the start of data receiving from the CAN controller collide, according to the embodiments of the present invention.

If the bits are applied from the receiving unit 101a simultaneously when the transmitting unit 101b starts to transmit data of the CAN frame stored in the inward buffer 103, the bits being applied from the receiving unit 101a are not copied right onto the receiving line C_Rx. Instead, each bit of the CAN frame 52 to transmit to the CAN controller 10 is transmitted while competing (P50) with each bit applied from the receiving unit 101a, as illustrated in FIG. 5.

More specifically, either the bit string 52 to transmit to the CAN controller 10 or the bit string 51 supplied from the receiving unit 101a is output onto the receiving line C_Rx on a bit-by-bit basis until their bits are equal to each other. And, when only one bit string becomes a value of the dominant level first, its bits are transmitted up to the end of the frame and the other bit string is ignored. That is, as illustrated in the figure, if a logic 0 appears first (521) in the bit stream 52 being transmitted by itself, the transmitting unit 101b reads the data bits from the inward buffer 103 up to the end of the frame and transmits through the receiving line C_Rx (53). The data of the transmitted frame is deleted from the inward buffer 103. If a logic 0 appears in the bit string fed back from the receiving unit 101a first, the transmitting unit 101b successively transmits the fed-back bits to the receiving line C_Rx, and stops reading data from the inward buffer 103. The data of the frame of which reading is stopped is stored in the inward buffer 103 as it is.

On the other hand, according to the CAN communication protocol, the external CAN controller 10 transmits up to the end of the CAN frame if the bit stream, in particular the bit pattern carried in the arbitration field, being transmitted through the transmission line C_Tx by itself appears on the receiving line C_Rx. If a logic 0 appears in the receiving line C_Rx even though the CAN controller 10 has driven the transmission line C_Tx to a recessive level, that is, has output a value of logic 1, the CAN controller 10 interrupts data transmission through the transmission line C_Tx.

If the frame end pattern does not appear at normal location in the bits received through the transmission line C_Tx due to the data transmission interruption of the CAN controller 10, the receiving unit 101a discards the received bits being temporarily stored. Of course, when the data is received up to the frame end pattern without interruption, the received bits stored temporarily are moved into the outward buffer 102 as a CAN frame. At this time, as described above, the bits such as the frame start bit and the frame end pattern etc. may be excluded in the storing of the received bits in the outward buffer 102 as a CAN frame.

In another embodiment according to the present invention, in the case of a competition between a bit string supplied from the receiving unit 101a and another bit string read from the inward buffer 103 to be transmitted, when the latter is determined as dominant (that is, when the value of the dominant level appears in the latter first), the transmitting unit 101b may notify the receiving unit 101a of the fact that transmission is dominant. If there is such a notification, the receiving unit 101a ignores the bit string currently being received from the CAN controller 10 and discards the bit string stored temporarily until then.

According to another embodiment of the present invention, in the case that a bit is fed back from the receiving unit 101a at the same time when transmission of the data read from the inward buffer 103 through the receiving line C_Rx is attempted, which one to be carried onto the receiving line C_Rx up to the end of a frame may be determined based on the remaining space of the inward buffer 103 instead of determining either to be transferred to the CAN controller 10 by competition as described above.

Figure 6:
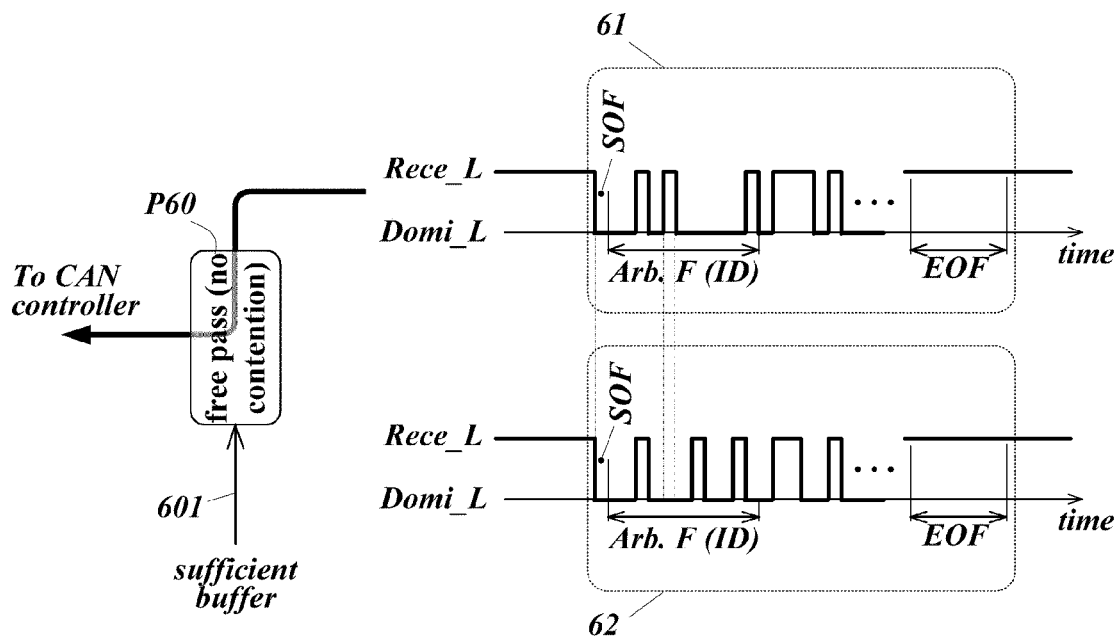

FIG. 6 illustrates the determination method according to the present embodiment. For example, when the ratio of the remaining space of the inward buffer 103 is equal to or higher than a reference ratio (e.g., 5%, 10%, etc.), which means the state 601 in which the inward buffer 103 can sufficiently accommodate the CAN frames to be received from the high-speed bus, the transmitting unit 101b transfers the bit string 61 being fed back from the receiving unit 101a onto the receiving line C_Rx unconditionally without competition (P60) by ignoring the CAN frame 62 to be transmitted from the inward buffer 103 even if it has a higher priority than the frame 61 being delivered from the receiving unit 101a. This is to prioritize the CAN frame being currently transmitted by the CAN controller 10 so that its data can be transmitted up to the end.

If the remaining space is less than the reference ratio, the transmitting unit 101b determines either frame to be transferred up to the end through the competition described above.

On the other hand, the receiving unit 101a continuously checks the size of the remaining space of the outward buffer 102 to determine whether the outward buffer 102 is fully used, that is, whether the buffer is full with stored frames. Through knowledge of the remaining size, it is checked whether a data bit is received through the transmission line C_Tx in the state where there is no space to write in the outward buffer 102 at present. If such a case is confirmed, the receiving unit 101a does not deliver, namely, feedback the bit string received through the transmission line C_Tx to the transmitting unit 101b. Instead, it delivers a bit string of an arbitrary frame with a unique ID having the highest priority, for example, a unique ID consisting of only logical zeros, in the CAN communication protocol to the transmitting unit 101b. Because this bit string is carried by the transmitting unit 101b onto the receiving line C_Rx, the CAN controller 10 stops transmission of the frame data according to the priority by the arbitration field.

In addition, the arbitrary frame generated by the receiving unit 101a may be configured such that the information of the data field is to be ignored or discarded by the CAN controller 10 to receive the arbitrary frame. For example, the arbitrary frame may be configured to have a data field of zero length.

In one embodiment of the present invention, if data bits are received through the transmission line C_Tx in the state where the link controller 110 cannot normally transmit data via the high-speed bus, the receiving unit 101a applies the received bits to the transmitting unit 101b as they are. And, when the ACK field for the frame corresponding to the received bits starts, the receiving unit 101a maintains the level of the logic 1 with respect to the acknowledgment signal (ak). At this time, since the level of the digital signal received and fed back (fb) by the receiving unit 101a is also logic 1, the digital signal output finally (ffb) by the AND gate A1 becomes logic 1 which indicates a negative acknowledgment (NACK).

For the selective negative acknowledgment (NACK) of the receiving unit 101a, if an acknowledgment (ACK) signal is not received after transmitting data to other nodes in compliance with the communication protocol defined for the high-speed bus, or an abnormal state, such as the inability to transmit data due to a faulty transmitter, where the data transmission cannot be normally completed continues for more than a specified threshold time, the link controller 110 notifies the receiving unit 101a of the communication failure state. Accordingly, if data bits are received through the transmission line C_Tx in the state where this notification is made, the receiving unit 101a causes the value of the recessive level to be inserted into the ACK field for the bit stream of the received frame.

When the frame with the ACK field carrying a digital signal indicating a negative acknowledgment, which is inserted by the receiving unit 101a, is transferred onto the receiving line C_Rx by the transmitting unit 101b, the CAN controller 10 detects the NACK signal and generates an error frame onto the transmission line C_Tx. The receiving unit 101a that has inserted the NACK signal into the ACK field ignores the error frame appearing on the transmission line C_Tx.

As the CAN controller 10 does not receive the acknowledgment signal, it transmits the data bits of the CAN frame again through the transmission line C_Tx. If the process of receiving the NACK signal is repeated because the communication failure state is not remedied yet, the CAN controller 10 determines that the bus is abnormal, and no longer performs transmission of the CAN frame.

Figure 7:
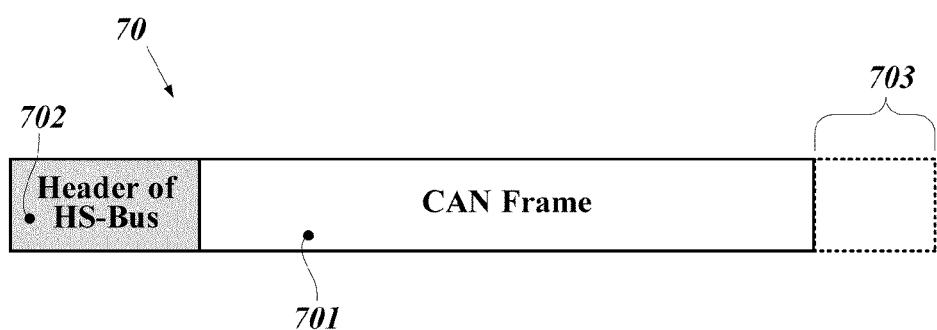
FIGS. 7 and 8 respectively show examples in which data received in form of a frame from the CAN controller is configured in a format suitable for a high-speed bus according to the embodiments of the present invention.

While the receiving unit 101a and the transmitting unit 101b are operating as described above, the link controller 110 retrieves the CAN frames stored in the outward buffer 102 in the order in which they were stored, configures each of the read CAN frames into the link format 70, as illustrated in FIG. 7, in compliance with the communication protocol of the high-speed bus, and transmits the format-converted frame to other nodes through the physically connected bus. The link format to be used at this time has a form in which a header 702 necessary for inter-link transmission on the high-speed bus is placed before the CAN frame 701 being retrieved from the outward buffer 102. Each field of the header is configured in compliance with the type of high-speed bus to which the bus adapter is applied according to the present invention. Depending on the communication protocol of the high-speed bus to be adopted, an additional field 703 may be added at the rear end of the CAN frame 701 to be transmitted.

The CAN frame to be packed into the link frame defined for the high-speed bus may not include the frame start bit, the frame end pattern and the like.

The link controller 110 deletes a corresponding CAN frame in the outward buffer 102 when it is confirmed that the link frame transmitted by itself has been received by other nodes.

In addition, the link controller 110 detects signals being carried on the connected high-speed bus, organizes a link frame 70 to be configured as illustrated in FIG. 7 from data of the detected signals, extracts a CAN frame from the organized link frame, and finally stores it in the inward buffer 103.

If the extracted CAN frame does not include a frame start bi, a frame end pattern and the like, the link controller 110 may store the extracted CAN frame in the inward buffer 103 after adding a frame start bit, a frame end pattern and the like at the front and back of the extracted CAN frame. Of course, such bit adding operation may be conducted by the transmitting unit 101b instead of the link controller 110.

On the other hand, in an embodiment according to the present invention, the link controller 110 is preset with reception filtering information for determining only which kinds of CAN frames are to be received, or is connected to a signal line c10 which such filtering information is transmitted through. The latter case can be easily implemented by extending the circuit line for SPI (Serial Parallel Interface) to the link controller 110 if the CAN controller 10 is configured such that the filtering information is to be set therein through SPI.

According to another embodiment of the present invention, the reception filtering information may be set in the link controller 110 by signaling in compliance with the CAN communication protocol through the transmission line C_Tx connected between the CAN controller 10 and the bus adapter 100. To this end, in the present embodiment, when the CAN controller 10 transmits the reception filtering information to the bus adapter 100, it constructs a CAN frame with a special unique ID different from the unique ID to be used for transmitting a CAN frame to other nodes, and transmits the CAN frame with the special unique ID, which includes the reception filtering information in the data field thereof, through the transmission line C_Tx. The special unique ID is a reserved identifier in the receiving unit 101a, preferably a unique ID having a very low priority in the CAN communication protocol, which is not generally assigned to general-purpose CAN controllers. Since the data field has a maximum size of 8 bytes, the CAN frame is transmitted several times depending on the number of unique IDs to be allowed for receiving from the high-speed bus.

Therefore, if a CAN frame made from the bit signals received through the transmission line C_Tx has an arbitration field filled with the reserved specific unique ID, the receiving unit 101a does not store it in the outward buffer 102. Instead, the receiving unit 101a delivers the information in the data field of the CAN frame, that is, information on the unique ID(s) to be allowed for receiving, to the link controller 110 so as to be set as the reception filtering information in the link controller 110.

In the embodiment in which the reception filtering information is set according to any one of the methods described above, the link controller 110 checks the unique ID of a CAN frame 701 unpacked from a link frame 70, formatted as illustrated in FIG. 7, received from the high-speed bus, and stores the CAN frame in the inward buffer 103 only if the unique ID accords with the set reception filtering information, i.e., belongs to the reception filtering information, and otherwise discards it.

In this way, if the CAN frames are filtered and then stored in the inward buffer 103, only the CAN frames intended to be received by the CAN controller 10 occupy the receiving line C_Rx. This is differentiated from the conventional method in which all the CAN frames carried on the CAN bus occupy the receiving line C_Rx.

According to the CAN communication protocol, the data transmission of the CAN controller 10 using the transmission line C_Tx is impossible while the receiving line C_Rx is occupied. Thus, the shorter the time that the receiving line C_Rx is occupied, the larger the time that the CAN controller 10 can transmit data. This means that the occurrence frequency of waiting for data transmission and the duration of such a case are reduced.

Therefore, by allowing the link controller 110 to filter the CAN frames and causing the transmitting unit 101b to transmit the filtered CAN frames to the CAN controller 10, the CAN controller 10 can start to transmit a CAN frame much earlier in probability than the conventional art. In addition, more time is available for transmission. Of course, CAN frames are also transmitted to other nodes at a speed increased by the high-speed bus.

In another embodiment of the present invention, the reception filtering information may be set or applied to the transmitting unit 101b instead of the link controller 110. In the present embodiment, the link controller 110 stores all the CAN frames, which are extracted from the link frames carried on the high-speed bus, in the inward buffer 103, and the transmitting unit 101b transmits only frames according with the reception filtering information among the stored CAN frames through the receiving line C_Rx. Of course, if the CAN frames to be transmitted does not accord with the reception filtering information, they are deleted from the inward buffer 103.

Figure 8:
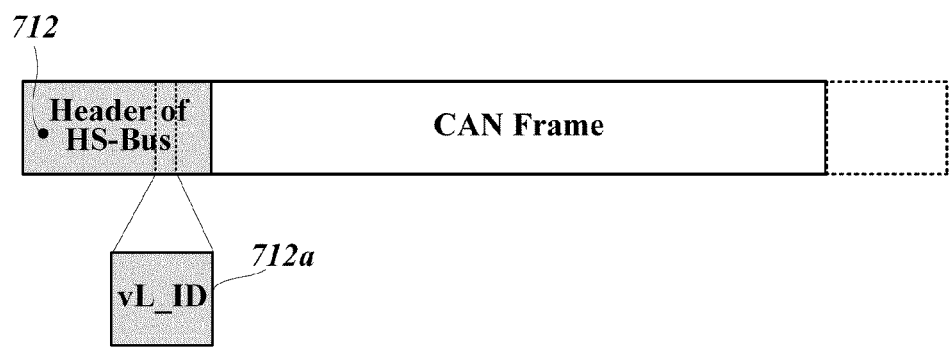

In an embodiment according to the present invention, the header 712 of the link frame for transporting a CAN frame may be configured to include a virtual link identification field 712a as illustrated in FIG. 8. In this embodiment, when building a link frame for transporting a CAN frame, the link controller 110 writes a virtual link number assigned to itself in the corresponding field 712a to form the header 712, and then transmits the built frame with the header 712 to other nodes via the high-speed bus.

In the embodiment illustrated in FIG. 8 in which the virtual link identification field is inserted into the link frame to be transmitted via the high-speed bus, data is transmitted and received only among the bus adapters equipped with the link controllers to which the same virtual link number is assigned, that is, data communication is made only among the nodes to which those bus adapters belong. To be more specific, a link frame constructed to include a certain virtual link number in the header, as described above, by the link controller 110 is received only by other link controllers assigned with the virtual link number matching, namely, identical to the certain virtual link number (that is, the same virtual link number as the link controller 110) included in the link frame. Similarly, when the header of a link frame, which is constructed as illustrated in FIG. 8 from the detected signals carried on the high-speed bus, is checked, the link controller 110 also discard the constructed link frame if the number of the virtual link identification field 712a is different from that assigned to itself. And, the link controller 110 stores a CAN frame unpacked from the constructed link frame in the inward buffer 103 only if said both numbers are the same. Of course, if the reception filtering information is set as in the embodiment described above, the extracted CAN frame is selectively taken and stored in the inward buffer 103.

According to the embodiment of FIG. 8, even if a large number of nodes are connected to the high-speed link, the nodes can be divided into a plurality of groups by the virtual link numbers so that information can be communicated only among the same groups. That is, even if the CAN controllers distributively connected to N CAN buses are grouped by the virtual link numbers via the bus adapters and are all connected to the single high-speed bus, the same communication performance as the conventional art using N CAN buses is maintained under the assumption that the service speed of the high-speed bus is N times faster than that of the individual CAN bus to be replaced. This is because, even when there are many nodes connected to a single bus, the allocated virtual link numbers prevent the frames generated individually by the nodes from being transmitted to the CAN controllers of all connected nodes.

In another embodiment according to the present invention, a plurality of virtual link numbers for selective receiving may be allocated together with a virtual link number for transmission. In this embodiment, when the link controller 10 (also other link controllers of other nodes) transmits a link frame through the high-speed bus, it uses the single virtual link number assigned for transmission. For a link frame to be received from the high-speed bus, when a number written in the virtual link identification field 712a matches the plurality of assigned virtual link numbers, that is, coincides with any of the plurality of virtual link numbers, the link frame is received. Otherwise, it will be discarded.

All of the CAN controllers, each being connected through the bus adapter 100 operating as described above, can transfer data at an earlier point in time and faster.

In addition, if a conventional CAN bus is replaced with the high-speed bus having a much wider bandwidth, it becomes possible to connect conventional electronic control devices, which are to be inevitably divided over a plurality of CAN buses, to a single high-speed bus, so that processes such as wiring and assembly etc. become much simpler. This effect would be remarkably doubled if the use of the above-described reception filtering information and the use of the virtual link number are applied in combination with each other.

Unless the various embodiments, for the devices configured to provide an enhanced speed bus to connected nodes, described so far are incompatible with each other, the explained embodiments can be properly chosen in various ways and then combined to embody the concept and idea of the present invention.

The embodiments of the present invention described above have been introduced for the purpose of illustration; therefore, it should be understood by those skilled in the art that modification, change, substitution, or addition to the embodiments is possible without departing from the technical principles and scope of the present invention defined by the appended claims.

What is claimed is:

1. A device for providing a bus that allows nodes to communicate with each other, the device comprising:
    an interface unit configured
        to be connected to a Communication Module (CM) via a first signal line and a second signal line that are separated from each other, wherein the CM is intended to transmit and receive data over a bus based on a first Communication Protocol (CP),
        to receive a first bit string carried on the first signal line when the CM drives the first signal line according to bit values of an arbitrary bit string, and
        to drive the second signal line according to bit values of a second bit string, the CM receiving the second bit string carried on the second signal line;
    a first buffer configured to store data of an arbitrary format constituted from the first bit string received by the interface unit from the CM via the first signal line;
    a link control unit configured
        to be connected to a data bus of a second CP having a transmission speed higher than the transmission speed of the first CP,
        to transmit data stored in the first buffer through the data bus, and
        to receive data carried on the data bus; and
    a second buffer configured to store the received data via the link control unit in an arbitrary format,
    wherein the interface unit is further configured to transmit data stored in the second buffer to the CM via the second signal line in form of a specific format defined by the first CP, to drive the second signal line according to the first bit string to be fed back to the CM as it is being received through the first signal line from the CM, and to drive the second signal line according to bit strings of the data stored in the second buffer, and
    wherein the interface unit is further configured to drive the second signal line so that a data frame of the specific format is transmitted via the second signal line instead of the first bit string received via the first signal line when there is no space to store the received first bit string in the first buffer, the data frame having an identifier of the highest priority in bus arbitration applied to the first CP, that causes the CM to stop driving the first signal line.

2. The device of claim 1, wherein the interface unit is further configured to drive the second signal line so that an acknowledgment signal is transmitted, via the second signal line, to the CM for a duration corresponding to an ACK slot of the received first bit string having the specific format.

3. The device of claim 2, wherein the interface unit is further configured to when the first bit string is received in a state where transmission of the data stored in first buffer through the data bus of the second CP is not completed, drive the second signal line so that a negative acknowledgment signal is transmitted, via the second signal line, to the CM for a duration corresponding to the ACK slot.

4. The device of claim 2, wherein the interface unit is further configured to drive the second signal line, for a duration corresponding to the ACK slot, to a result obtained by logically computing a logical value on the first signal line and a logical value indicating an acknowledgment of the received first bit string.

5. The device of claim 1, wherein the interface unit is further configured to create the data frame in such a manner that information contained in the data frame is ignored by the CM.

6. The device of claim 1, wherein the interface unit is further configured to drive the second signal line so that signals resulting from contention between the first bit string and the second bit string based on the first CP is transmitted via the second signal line when start of receiving the first bit string through the first signal line and start of transmitting the second bit string of data stored in the second buffer through the second signal line collide with each other.

7. The device of claim 1, wherein the interface unit is further configured to drive the second signal line so that signals of a first bit string being received through the first signal line is carried on the second signal line without contention between the first bit string and a second bit string based on the first CP if remaining space of the second buffer is larger than a predetermined threshold when start of receiving the first bit string and start of transmitting the second bit string of data stored in the second buffer through the second signal line collide with each other.

8. The device of claim 1, wherein filtering information is set in the link control unit or the interface unit, the filtering information given in such a manner that only data of the arbitrary format, among data received by the link control unit from the data bus, containing an identifier matching the filtering information is transmitted to the CM through the second signal line.

9. The device of claim 8, wherein the filtering information is received by the interface unit through the first signal line as data of a format defined by the first CP.

10. The device of claim 8, wherein the link control unit is further configured:
    to construct data to be transmitted through the data bus into a frame with a header including a specific number assigned as a link identifier;
    to transmit the constructed frame through the data bus; and
    to store data carried in another frame in the second buffer when a header of the another frame contains a number, as the link identifier, that matches at least one assigned number including the specific number, the another frame being constructed from the received data from the data bus.

11. The device of claim 10, wherein at least two different numbers corresponding to the link identifier are assigned to a plurality of link control units connected to the data bus of the second CP, and each of the at least two numbers is assigned to a plurality of link control units.

12. The device of claim 1, wherein the first CP is a CP defined by CAN (Controller Area Network) or CAN-FD (CAN with Flexible Data).

13. The device of claim 1, wherein the link control unit is further configured:

to construct data to be transmitted through the data bus into a frame with a header including a specific number assigned as a link identifier;

to transmit the constructed frame through the data bus; and to store data carried in another frame in the second buffer when a header of the another frame contains a number, as the link identifier, that matches at least one assigned number including the specific number, the another frame being constructed from the received data from the data bus.

\* \* \* \* \*